(12) United States Patent
Heckendorn

(10) Patent No.: US 9,182,470 B2
(45) Date of Patent: Nov. 10, 2015

(54) INCLINOMETER FOR A SOLAR ARRAY AND ASSOCIATED SYSTEMS, METHODS, AND COMPUTER PROGRAM PRODUCTS

(75) Inventor: Charles W. Heckendorn, Phelan, CA (US)

(73) Assignee: COGENTRIX DEVELOPMENT HOLDINGS, LLC, Charlotte, NC (US)

( * ) Notice: Subject to any disclaimer, the term of this patent is extended or adjusted under 35 U.S.C. 154(b) by 1194 days.

(21) Appl. No.: 12/620,371

(22) Filed: Nov. 17, 2009

(65) Prior Publication Data
US 2011/0114079 A1    May 19, 2011

(51) Int. Cl.
F24J 2/38        (2014.01)
G01S 3/786      (2006.01)
F24J 2/54        (2006.01)

(52) U.S. Cl.
CPC .............. *G01S 3/7861* (2013.01); *F24J 2/38* (2013.01); *F24J 2/541* (2013.01); *F24J 2/542* (2013.01); *Y02E 10/47* (2013.01)

(58) Field of Classification Search
CPC ....................................... F24J 2/38; F24J 2/40
USPC ........ 126/574, 576, 425, 424, 600; 250/203.4
See application file for complete search history.

(56) References Cited

U.S. PATENT DOCUMENTS

| | | | |
|---|---|---|---|
| 4,440,150 A | | 4/1984 | Kaehler |
| 4,519,382 A | * | 5/1985 | Gerwin .......................... 126/578 |
| 4,564,275 A | * | 1/1986 | Stone ................................ 353/3 |
| 5,365,671 A | * | 11/1994 | Yaniger ...................... 33/366.12 |
| 5,734,371 A | | 3/1998 | Kaplan |
| 6,005,236 A | * | 12/1999 | Phelan et al. .............. 250/203.4 |
| 6,043,778 A | | 3/2000 | Froeberg et al. |
| 6,123,067 A | | 9/2000 | Warrick |
| 6,160,395 A | | 12/2000 | Goetz et al. |

(Continued)

FOREIGN PATENT DOCUMENTS

WO    WO 2005/026628 A1    3/2005
WO    WO2005/026628 A1    3/2005

(Continued)

OTHER PUBLICATIONS

International Search Report for PCT/US2010/056728 dated May 23, 2011.

(Continued)

*Primary Examiner* — Gregory Huson
*Assistant Examiner* — Nikhil Mashruwala
(74) *Attorney, Agent, or Firm* — Moore & Van Allen PLLC; W. Kevin Ransom

(57) ABSTRACT

Embodiments of the invention relate to an inclinometer for use in tracking movement of a moveable structure such as a solar array. The inclinometer includes a magnetometer for sensing changes in a magnetic field indicative of movement of the movable structure. This movement information is then used to determine a current position/orientation of the moveable structure. In the context of a solar array, this information is used to determine the current position/orientation of the solar array. In some embodiments where the movable structure is a solar array, sun position data either from a database listing sun position information for different times of day or data based on algorithmic calculations may be used to determine a difference between current position of the sun and a current position/orientation of the solar array. The solar array may then repositioned based on this determined difference.

18 Claims, 10 Drawing Sheets

(56) References Cited

U.S. PATENT DOCUMENTS

| | | | |
|---|---|---|---|
| 6,680,693 B2 | 1/2004 | Urban | |
| 6,899,096 B2* | 5/2005 | Nakamura | 126/581 |
| 6,931,323 B2 | 8/2005 | Choi et al. | |
| 7,315,781 B2 | 1/2008 | Litchfield et al. | |
| 7,432,488 B1 | 10/2008 | Hines et al. | |
| 7,453,395 B2* | 11/2008 | Thomas et al. | 342/357.34 |
| 8,122,878 B1* | 2/2012 | Gross et al. | 126/600 |
| 8,973,570 B2* | 3/2015 | Stavrou et al. | 126/573 |
| 2003/0169200 A1 | 9/2003 | Urban et al. | |
| 2007/0001920 A1 | 1/2007 | Webb et al. | |
| 2007/0057840 A1 | 3/2007 | Thomas et al. | |
| 2008/0011288 A1* | 1/2008 | Olsson | 126/576 |
| 2011/0048403 A1* | 3/2011 | Stavrou et al. | 126/573 |
| 2011/0114079 A1* | 5/2011 | Heckendorn | 126/574 |

FOREIGN PATENT DOCUMENTS

| | | |
|---|---|---|
| WO | WO2008/048478 A2 | 4/2008 |
| WO | WO2009/048879 A2 | 4/2009 |

OTHER PUBLICATIONS

International Preliminary Report on Patentability for PCT/US2010/056728 dated Feb. 17, 2012.

"Rugged Inclinometer Uses Hall Effect Technology"; http://instrumentation.co.za; SA Instrumentation & Control: The Official Journal of the SAIMC; Aug. 1, 2007.

"On Display in the South"; www.connectingindustry.com; Sep. 24, 2007.

"Magnetic Inclinometer"; Welding Magazine; Oct. 19, 1997.

POSITILT PTAS Magnetic Inclination Sensor with Analog Output; http://www.asm-sensor.com/asm/pdf/pro/ptas2_en.pdf; downloaded Nov. 19, 2010.

"New MEMS-Based Inclinometer"; Sensors & Transducers e-Digest, vol. 103, Issue 4, Apr. 2009: Product News (ISSN 1726-5479).

"ASM Introduces New MEMS-Based Tilt Sensor POSITILT"; www.directindustry.com; Apr. 1, 2009.

POSITILT PTAM2 MEMS Inclinometer with Analog Output; http://www.asm-sensor.com/asm/pdf/pro/ptam2_en.pdf; downloaded Nov. 19, 2010.

"ASM Sensors Introduces PTAM20 MEMS Inclinometer"; Automation.com; Jan. 27, 2010.

"Compact MEMS Inclinometer for OEM Applications"; www.directindustry.com; Jan. 27, 2010.

"ASM Sensors Announces PTAM27L Inclinometer"; Automation.com; Aug. 9, 2010.

"New MEMS-based Inclinometer with Linear Output"; www.directindustry.com; Aug. 23, 2010.

POSITILT PTAM27 MEMS Analog Inclinometer with Linear Output; http://www.asm-sensor.com/asm/pdf/pro/ptam27_de; downloaded Nov. 19, 2010.

"Magnetic Rotary Position Sensors PRAS21"; www.directindustry.com; Oct. 27, 2010.

POSIROT PRAS21 Magnetic Angle Sensor with Analog Output; http://www.asm-sensor.com/asm/pdf/pro/pras20_21_en.pdf; download Nov. 19, 2010.

"The Astronomical Almanac's Algorithm for Approximate Solar Position (1950-2050)", Michalsky, Joseph J., Solar Energy, vol. 40, No. 3, pp. 227-235, 1998.

"Solar Position Algorithm for Solar Radiation Applications", Reda, Ibrahim et al., National Renewable Energy Laboratory, NREL/TP-560-34302 (Revised Jan. 2008).

"An Algorithm for the Computation of the Solar Position", Grena, Roberto, Solar Energy, vol. 82, pp. 462-470, 2008.

"General Formula for On-axis Sun-tracking System and Its Application in Improving Tracking Accuracy of Solar Collector", Chong, K. K. et al., Solar Energy, vol. 83, pp. 298-305, 2009.

"Sun Tracking Systems: A Review", Lee, Chia-Yen et al., Sensors, vol. 9, pp. 3875-3890, 2009.

Formoso et al: "Development of a Hall Effect Inclinometer"; FMGM 95—4th International Symposium on Field Instrumentation in Geomechanics, Bergamo, IT, (1995), pp. 511-517.

Atlas Industrial Systems: "Rugged inclinometer uses Hall Effect technology"; SA Instrumentation & Control, The Official Journal of the SAIMC; Aug. 2007, p. 1.

GCC International Search Report dated May 22, 2014.

Examination Report for Gulf Cooperation Council (GCC) Application No. 2010-17145 dated Oct. 20, 2014.

* cited by examiner

INCLINOMETER FOR A SOLAR ARRAY AND ASSOCIATED SYSTEMS, METHODS, AND COMPUTER PROGRAM PRODUCTS

FIELD

In general, embodiments of the invention relate to systems, methods, and computer program products for use in a solar array, and, more particularly, to systems, methods, and computer program products for tracking and positioning/orienting of the solar array relative to a current position of the sun in the sky.

BACKGROUND

Solar energy conversion systems translate solar radiant energy into a useable form, such as thermal energy or electricity through solar array panels. In one process, the solar radiant energy is converted into thermal energy by focusing the sun's rays on a fluid, which is then used for power generation through the use of steam generation to drive turbines of electrical generators. Alternatively, the solar radiant energy is converted directly into electricity through the use of photovoltaic collection systems. Solar arrays are used for a wide variety of purposes, including as a utility power system, as a power supply for a remote or unmanned site, etc. A solar array's capacity ranges from a few kilowatts to a hundred kilowatts or more, and is capable of being installed wherever there is an area with exposure to the sun for significant portions of the day.

Utility power systems typically include solar arrays that are either direct or concentrating systems. The direct systems receive incident light directly from the sun's radiant energy and generate current. The direct systems typically include large arrays of photovoltaic cells. Conversely, the concentrating systems reflect the sun's incident light and either concentrate it onto an array of photovoltaic cells or heat a fluid that can then be used for power generation.

There are multiple ways of positioning solar arrays to track the sun. Some solar arrays have panels positioned in rows supported on a torque tube that serves as an axis of rotation. A drive system rotates or rocks the rows to keep the panels directed at the sun. Usually, the rows are arranged with their axes disposed in a north-south direction, and the drive system gradually rotates the rows of panels throughout the day from an east-facing direction in the morning to a west-facing direction in the afternoon. The rows of panels are brought back to the east-facing orientation for the next day of operation. Other panels have a two-directional axis of rotation around both the vertical and horizontal axis to allow the panels to rotate and tilt in order to maximize their exposure to the sun's solar radiant energy. A drive system is mounted on the panel axes to position the solar arrays in the proper directions.

In most solar arrays, a tracking system is employed to control the positioning of the concentrators as a function of the diurnal rotation and seasonal changes in orientation of the Earth relative to the sun. To maximize the radiant energy incident on the cells, mirror, lenses, etc., the arrays need to be positioned as accurately as possible toward the sun. For example, positioning the array in concentrator systems is important because the area of sun concentration may have an effective area of less than one percent (1%) of that required for direct systems. For the concentrator systems, an error of only one half degree of arc represents a misaiming of more than one solar diameter, which in some concentrator systems is unacceptable.

Some systems employ a sun sensor to provide feedback regarding positioning of the array relative to the sun. During evening hours or cloudy weather, when available solar energy is diminished, the solar arrays may become misoriented with respect to the sun. In order to conserve energy, the solar arrays are moved as little as possible, because every time the solar arrays are moved even a fraction of an inch, large amounts of power are used. When the sun appears again, the control system must be able to reorient the solar arrays over a wide angular range relative to the axis. Thus, improving the accuracy of the orientation of a solar array relative to the sun can significantly increase the efficiency of photovoltaic cells and/or concentrator systems.

To be practical the array positioning control systems for either direct or concentrator systems should be accurate, but inexpensive to help offset the high costs of solar arrays. This precludes certain designs that otherwise might be attractive. For example, a clock driven system could be employed in which the array is driven by the time of day only. However, such a system could not tolerate slippage in array positioning without resulting in misaiming. Such a non-slip system would require a solar array system rigid enough to withstand the anticipated wind loading. Such rigidity implies a bulky and expensive drive mechanism which makes the system very costly.

For this reason, many of the direct and concentrating control systems include various mechanical inclinometers used to detect positional changes in the movement of the solar array in combination with a sun sensor to detect the position of the sun. Inclinometers are used to detect angular inclination or displacement of the solar arrays. The reference is typically supplied by the gravitational pull of the Earth. The inclinometers that have been used in tracking systems in the past are often expensive, do not have the desired functionality and tolerances across applications, require frequent calibration, and are prone to failures due to the lack of durability, all of which result in increased costs.

There is a need to develop systems and methods to improve the control and tracking systems of various solar arrays, which will, in turn, improve the reliability, cost, and efficiency of the solar arrays.

SUMMARY

Embodiments of the invention relate to an inclinometer for use in tracking movement of a moveable structure such as a solar array. The inclinometer of at least one embodiment includes a magnetometer for sensing changes in a magnetic field indicative of movement of the movable structure. This movement information is then used to determine a current position/orientation of the moveable structure.

In some embodiments where the movable structure is a solar array, sun position data is used to determine a difference between current position of the sun and a current position/orientation of the solar array. The solar array may then be repositioned based on this determined difference.

For example, in one embodiment, the present invention comprises a system for monitoring/controlling a position of a solar array. The system comprises an inclinometer coupled to the solar array, wherein the inclinometer comprises one or more magnetometers configured to sense positional changes of the solar array about one or more axes based on changes in a sensed magnetic field. A processing device is in communication with the inclinometer. The processing device receives output from the magnetometer of the inclinometer and updates position information regarding the position of the solar array about the one or more axes. A drive system may also be associated with the solar array for altering the position of the solar array about the one or more axes based on commands from the processing device. The processing device may further compare a current position of the solar array about the one or more axes to data indicating a current position of the sun. Based on this comparison, the processing device may command the drive system to reposition the solar array to align the solar array with the sun.

In some embodiments, the processing device may be co-located in the same housing or at least on the solar array along with the inclinometer and the drive system so that determination of the position/orientation of the solar array, comparison of the position/orientation of the solar array to the current position of the sun, and movement of the solar array to position it relative to the sun all occurs at the solar array, as opposed to remotely.

In some embodiments, the source of sun position data is a sun sensor. In other embodiments, the sun position data is a database comprising sun position data indicating a position of the sun in the sky for a plurality of different times in a day for a given geographic location, such as sun position data provided by the U.S. Navy. In still another embodiment, the sun position data is calculated using a formula or algorithm.

In some embodiments, the magnetometer is capable of providing one of the following accuracies: 0.35 degrees, 0.0875 degrees, or 0.021875 degrees of arc of position/orientation of the solar array about an axis of rotation. More generally, the magnetometer is capable of providing an accuracy in the range of about 1.4 degrees to about 0.021875 degrees of arc.

The present invention also provided various methods for monitoring/controlling a position of a moveable structure such as a solar array. In one embodiment, the method comprises sensing positional changes of the solar array about one or more axes based on changes in a sensed magnetic field. The method further comprises updating position information regarding the position of the solar array about the one or more axes. The method may further include altering the position of the solar array about one or more axes.

In some embodiments, the method comprises comparing a current position of the solar array about the one or more axes to sun position data and based on this comparison, altering the position of the solar array about the one or more axes so as to align the solar array with the current position of the sun. In some embodiments, the sun position data is received from a sun sensor, while in other embodiments, the sun position data is provided either based on a formula or from a database listing a position of the sun in the sky at a given geographic location for different times during the day.

The present invention may also provide a computer program product for monitoring/controlling a position of a moveable structure such as a solar array. The computer program product includes a computer-readable medium having computer program code embodied therein. The computer program code comprises instructions for sensing positional changes of the solar array about one or more axes based on changes in a sensed magnetic field and instructions for updating position information regarding the position of the solar array about the one or more axes.

In some embodiments, a drive system may be connected to the moveable structure for altering the position/orientation of the moveable structure about an axis. In this embodiment, the computer-readable medium of the computer program product may further comprise instructions for input to the drive system to alter the position of the solar array about one or more axes. In some embodiments, the computer readable medium may include instructions for comparing a current position of the solar array about the one or more axes to sun position data and based on this comparison, altering the position of the solar array so as to align the solar array with the current position of the sun. In some embodiments, the sun position data is received from a sun sensor, while in other embodiments, the sun position data is provided either based on a formula or from a database listing a position of the sun in the sky at a given geographic location for different times during the day.

The above embodiments describe the invention in the context of a solar array. The systems, methods, and computer program products of the invention may be applied to various moveable structures where detection of position of the structure is desired. For example, in one embodiment, an inclinometer comprising a magnetometer may be coupled to the moveable structure. A processing device in communication with the inclinometer receives output from the magnetometer and updates position information regarding the position of the moveable structure about the one or more axes. A driving system may be associated with the moveable structure for altering the position of the moveable structure about the one or more axes based on commands from the processing device.

The processing device may be capable of comparing the current position of the moveable structure to a desire position for the moveable structure. For example, where the moveable structure is an antenna, crane, boom arm, mechanical arm, etc. positional information may be provided for orienting the moveable structure to a desired position. In these embodiments, the processing device determines the current position of the moveable structure based on information from the magnetometer and receives or determines desired position information for the structure and compares the two values. Based on this comparison, the processing device sends commands to the drive system to orient the moveable structure to the desired position.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
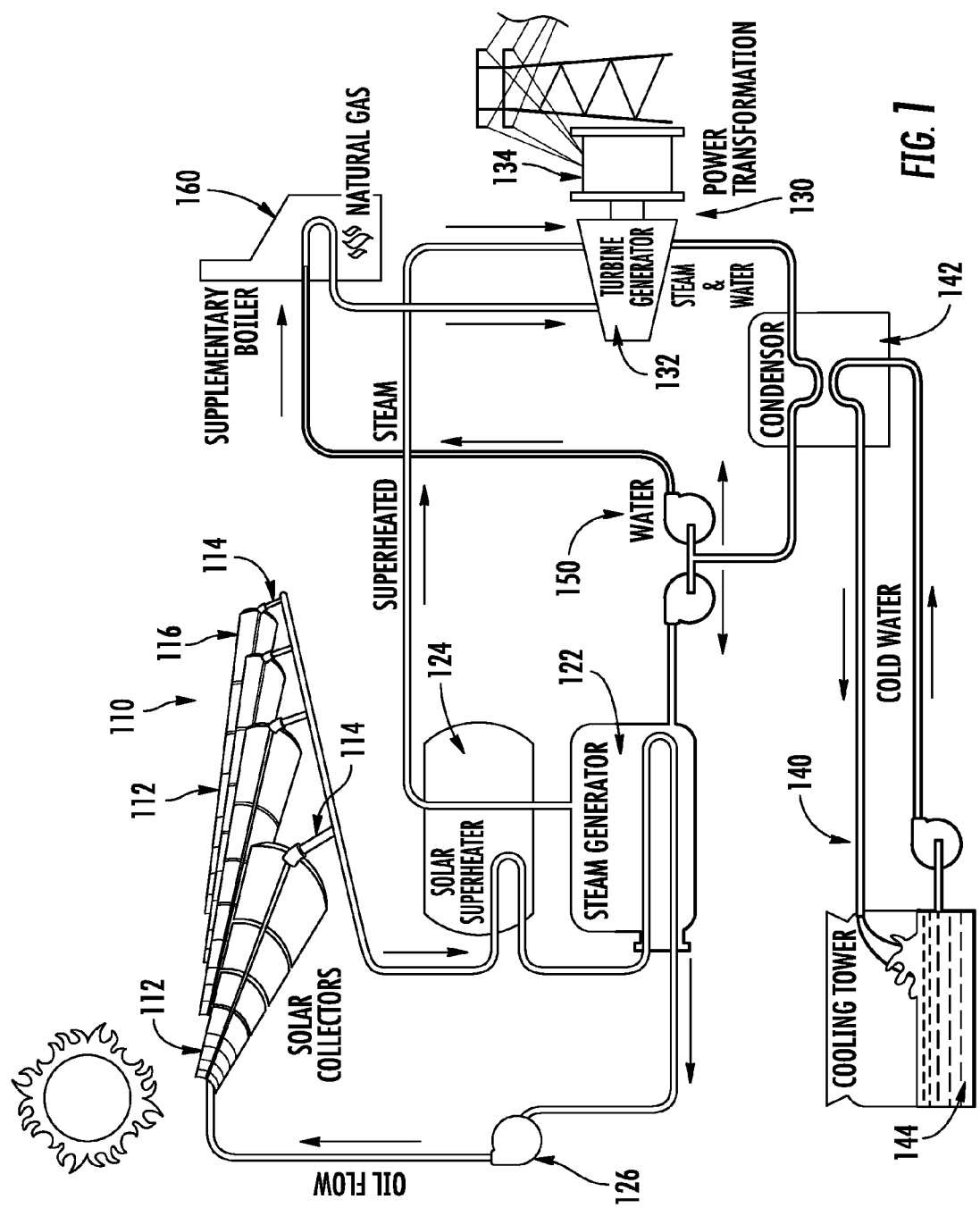
Figure 2A:
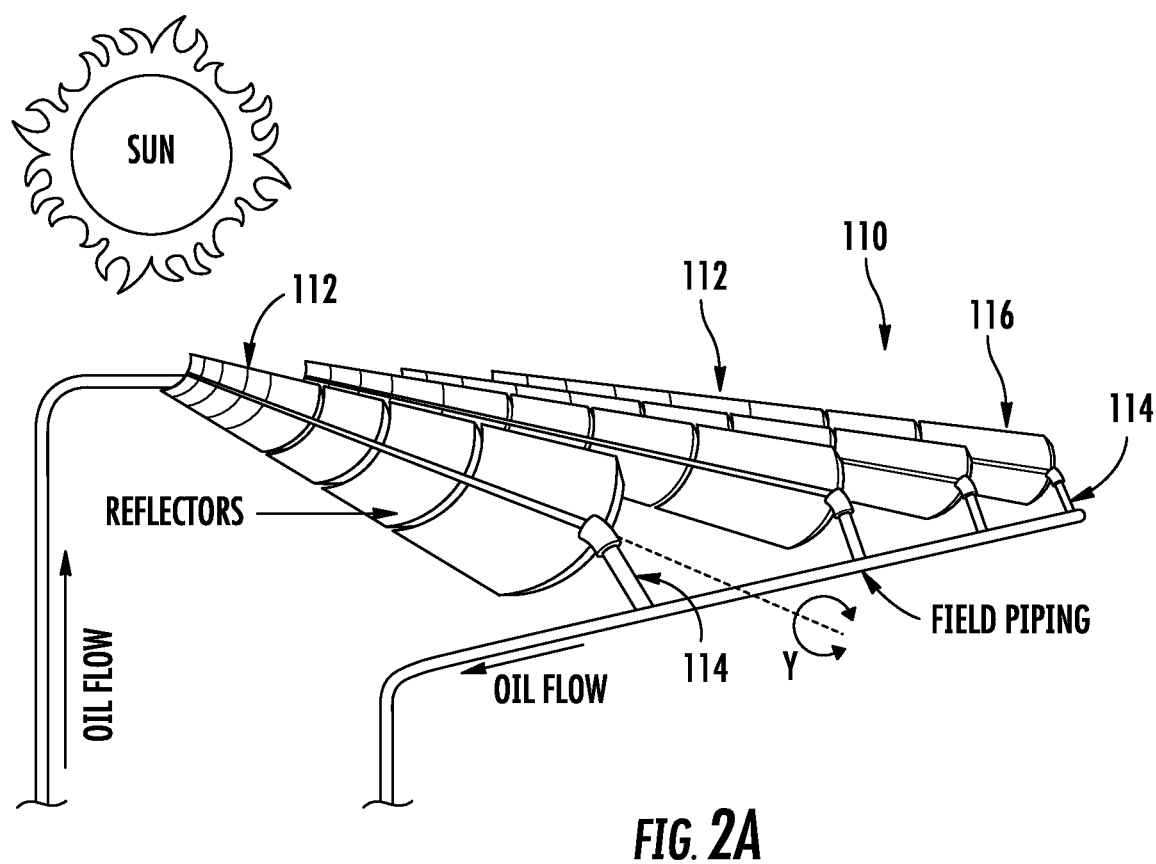
Figure 2B:
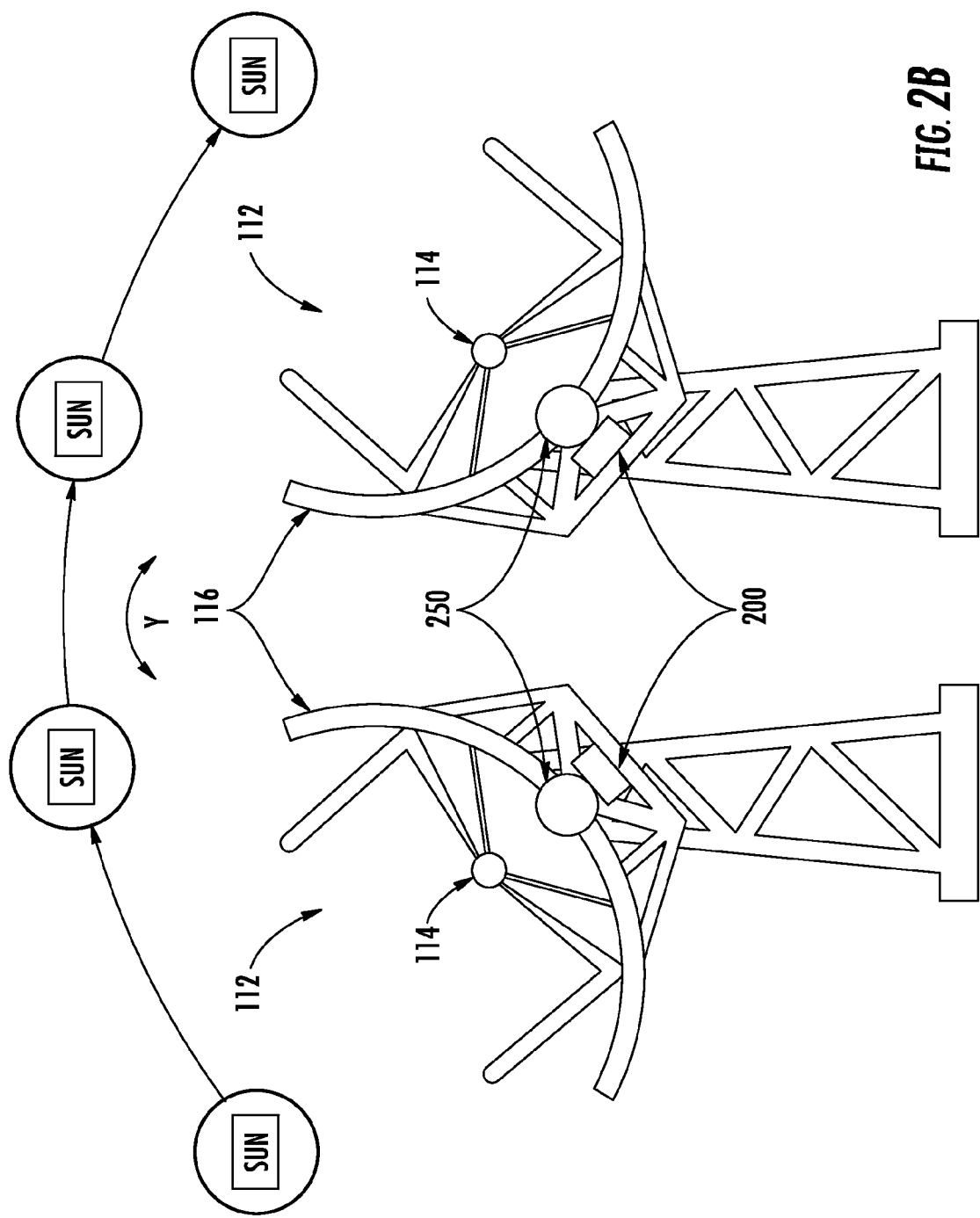
Figure 3:
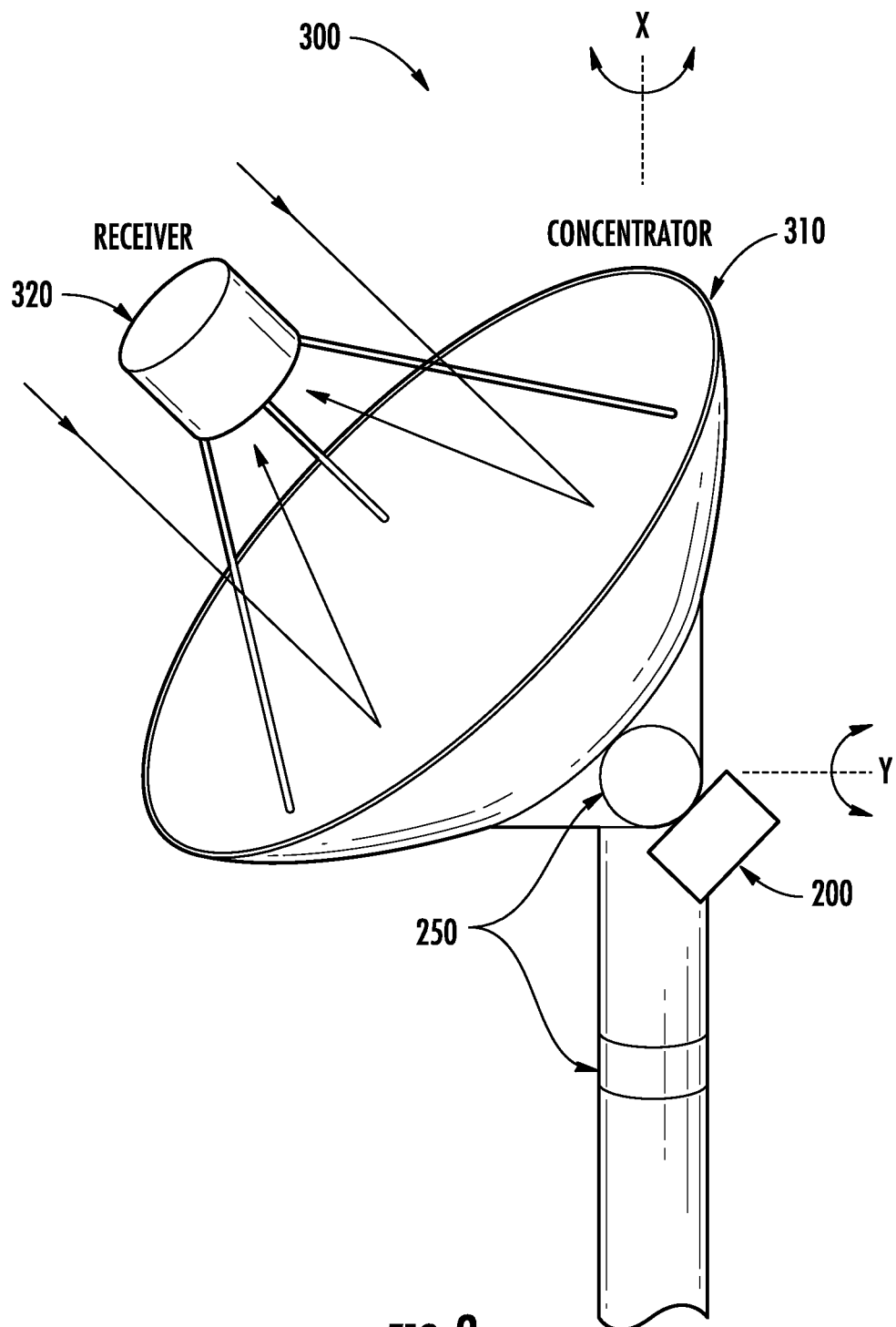
Figure 4:
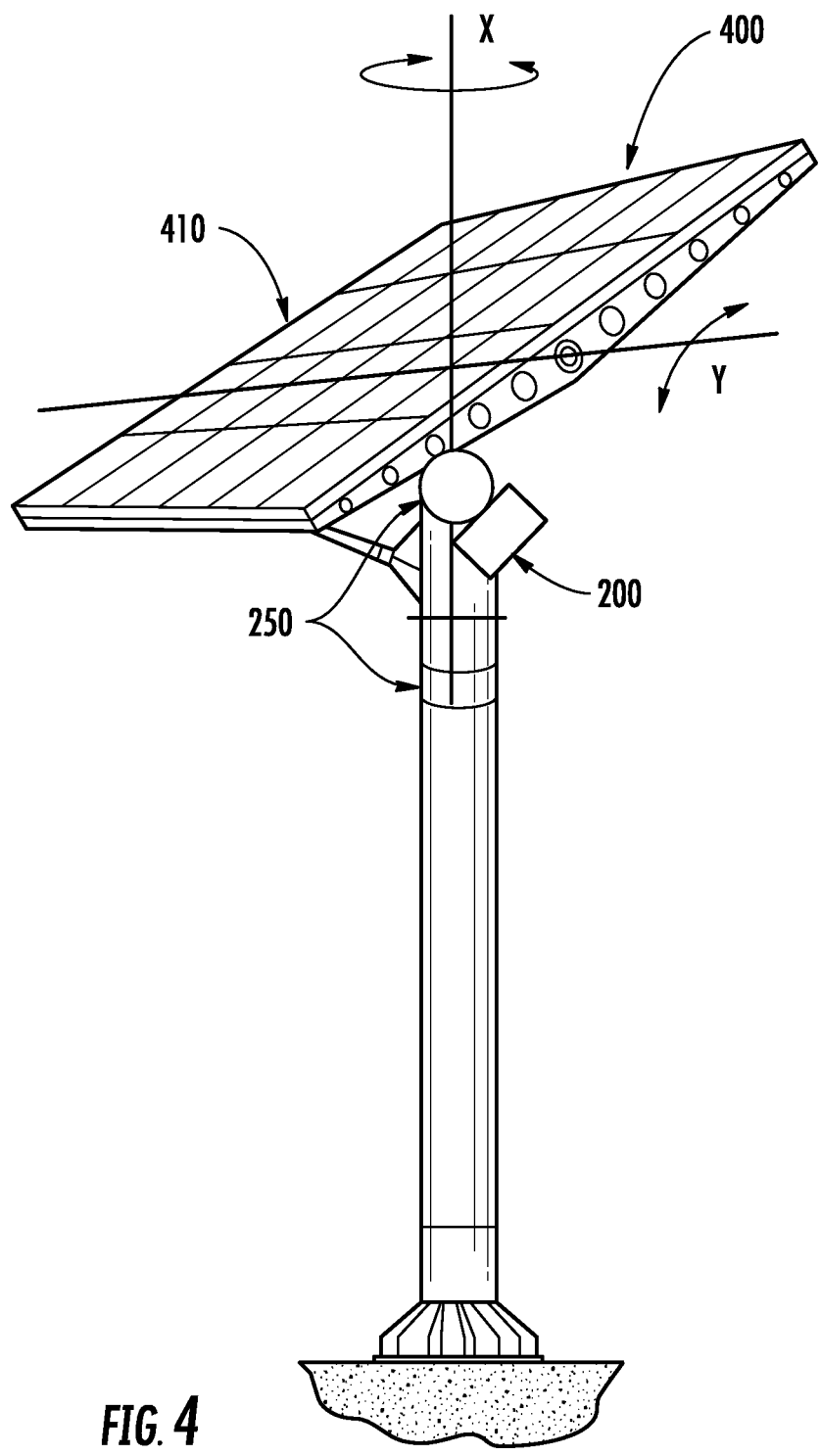
Figure 5:
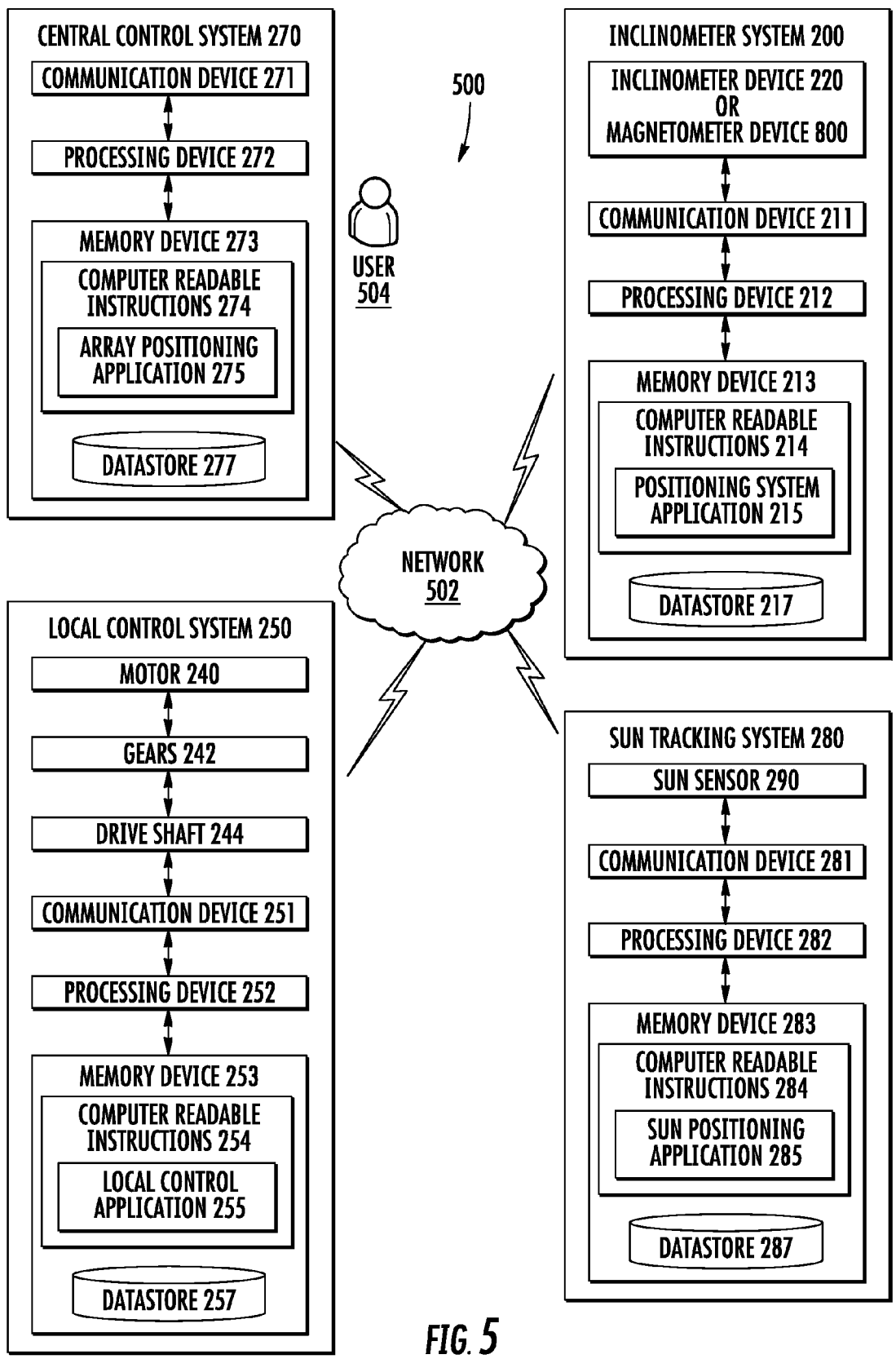
Figure 6:
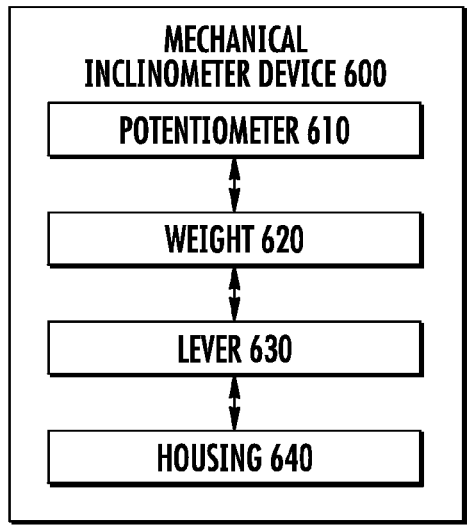
Figure 7:
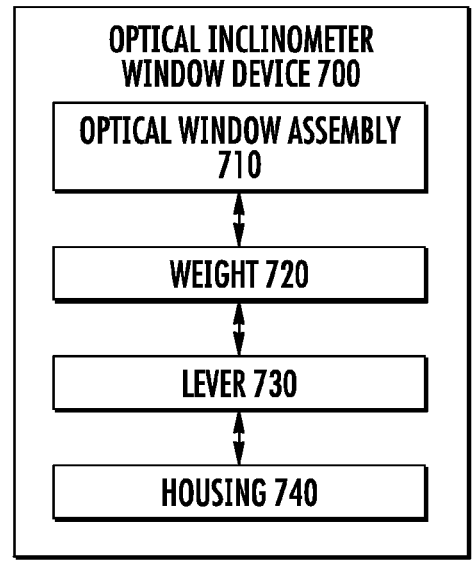
Figure 8:
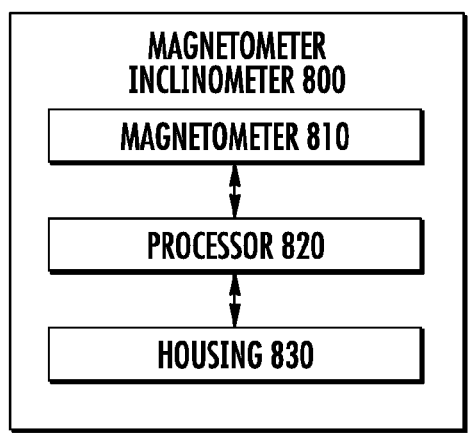
Figure 9:
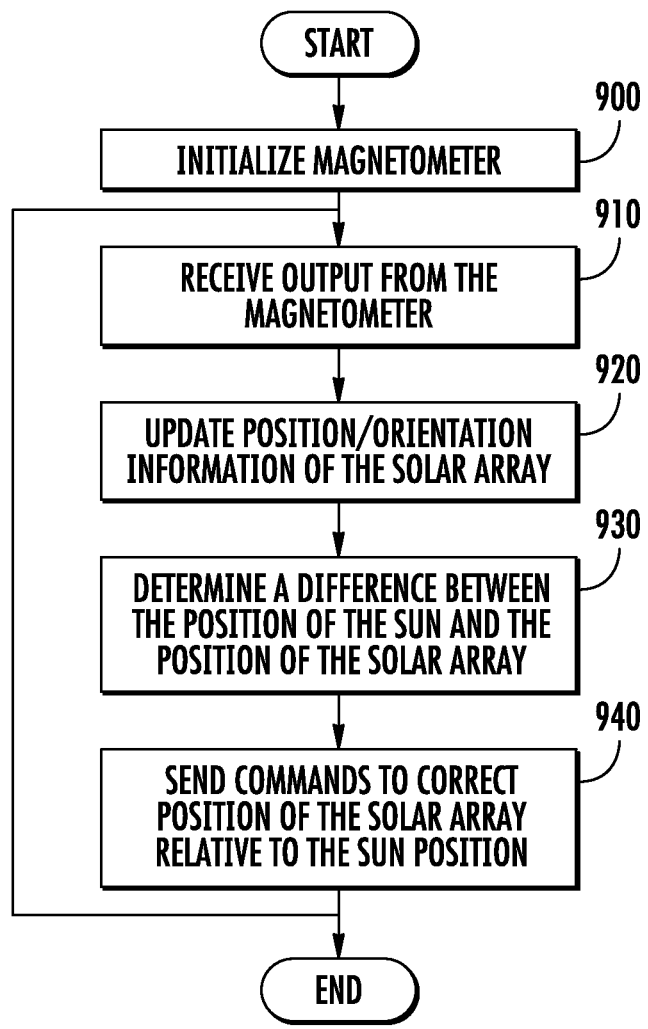
Figure 10:
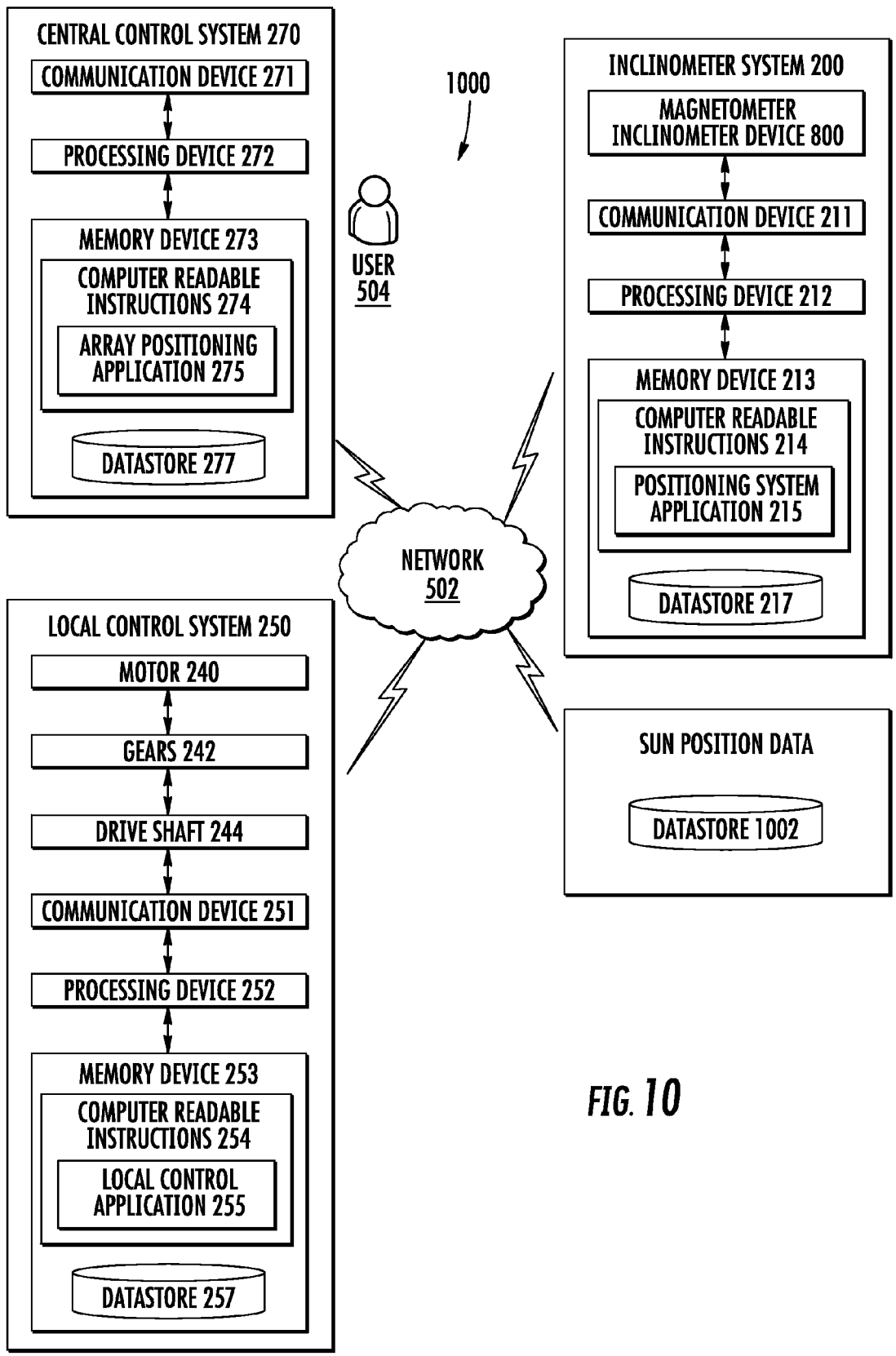
Figure 11:
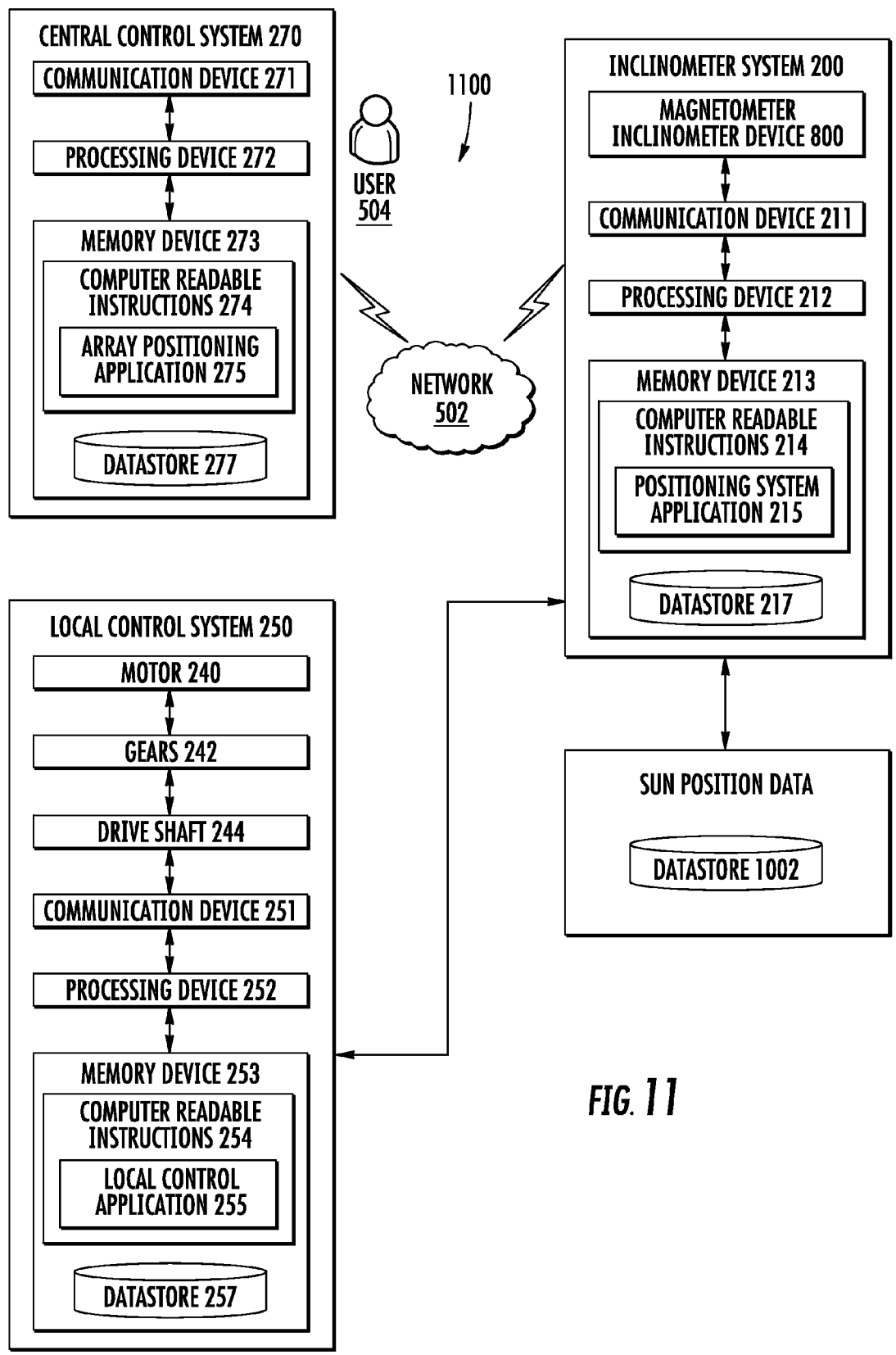

Having thus described embodiments of the invention in general terms, reference may now be made to the accompanying drawings:

FIG. 1 illustrates a concentrating thermal solar array, in accordance with one embodiment of the invention;

FIGS. 2A and 2B illustrate a concentrating thermal solar array assembly, in accordance with an embodiment of the present invention;

FIG. 3 illustrates a concentrating photovoltaic solar array assembly, in accordance with an embodiment of the present invention;

FIG. 4 illustrates a direct solar array assembly, in accordance with an embodiment of the present invention;

FIG. 5 illustrates a block diagram of the solar array assembly positioning system, in accordance with an embodiment of the present invention;

FIG. 6 illustrates a block diagram of a potentiometer inclinometer;

FIG. 7 illustrates a block diagram of an optical inclinometer;

FIG. 8 illustrates a block diagram of a magnetometer inclinometer, in accordance with an embodiment of the invention;

FIG. 9 illustrates an operational block diagram illustrating various method embodiments using a magnetometer inclinometer to monitor and correct position of a solar array relative to a position of the sun, in accordance with one or more embodiments of the invention;

FIG. 10 illustrates a block diagram of the solar array assembly positioning system, in accordance with an embodiment of the present invention; and FIG. 11 illustrates a block diagram of the solar array assembly positioning system, in accordance with an embodiment of the present invention.

DETAILED DESCRIPTION OF EMBODIMENTS OF THE INVENTION

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" includes systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer, or other programmable apparatus, to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

The systems and methods of the invention are used to track position/orientation of a structure of interest. It is envisioned that the systems and methods may have broad application to a range of technologies, such as positioning of antennas, positioning of solar arrays, positioning of boom arms or other moveable structures. To provide a more complete disclosure of the invention and provide context, the description below describes the systems, methods, and computer program products in use with a solar array. Further, solar arrays have particular positioning challenges for which the systems, methods, and computer program products provide various advantages. It is to be understood, however, that the below description should not be considered to limit application of the systems, methods, and computer program products.

There are various types of solar power systems, including direct photovoltaic, concentrating thermal, and concentrating photovoltaic solar power systems. FIG. 1 illustrates a schematic diagram of a concentrating thermal solar power system 100 in which the current systems, methods, and computer program products may be implemented. The concentrating thermal solar power system 100 in this embodiment illustrates the system that is used for the Solar Electric Generating Stations I & II ("SEGS") operating in the Mojave Desert and owned by Sunray Energy, Inc. The design of this system includes the following sub-systems: a concentrating thermal solar array system 110, a heat transfer fluid ("HTF") system 120, a power block system 130, a waste heat discharge system 140, a water supply and treatment system 150, and a natural gas-fired system 160, which could be replaced by a HTF heater in some embodiments.

The concentrating thermal solar array system 110 comprises a number of modular thermal solar collector assemblies ("TSCAs") 112 that are arranged in loops. Each loop has a heat collection element ("HCE") 114, containing a HTF, which is connected to the main HTF system 120. The HTF in each HCE 114 is heated by solar energy reflected from the TSCAs 112. The heated HTF flows through a series of heat exchangers in the steam generator 122, in order to convert water into steam. A portion of the HTF is diverted to another heat exchanger, called a solar superheater 124, for reheating the steam from the turbine generator 132 into superheated steam. The HTF flow is circulated by variable speed centrifugal pumps 126. The power block system 130 consists of a reheat steam turbine cycle utilizing a conventional turbine generator 132 unit and major steam-water cycle equipment with extractions to five feed-water heaters and the deaerator. The steam moves the blades of the turbine which creates power for the utility grid through the power transformation system 134. The water supply and treatment system 140 utilizes a condenser 142 to circulate cooling water to a mechanical draft cooling tower 144 located near the turbine generator 132. In other embodiments, the various sub-systems of the concentrating thermal solar power system 100 may be replaced by other conventional or non-conventional sub-systems that perform substantially the same functions as the sub-systems described above.

The TSCAs 112 are the basic components of the SEGS I & II systems and other similar concentrating thermal solar power systems 100. As illustrated in FIGS. 2A and 2B, each TSCA 112 has its own parabolic trough solar concentrator 116, inclinometer system 200, and local control system 250. The parabolic trough solar concentrator 116 is, in some embodiments, a mirrored glass reflector which focuses direct radiant energy on the HCE 114 to heat a fluid, such as oil, contained in the loops of each HCE 114. The trough solar concentrator 116 rotates about a y-axis to follow the path of the sun through the sky for maximizing the radiant energy incident on the concentrator. The inclinometer system 200, local control unit 250, and in some cases a sun tracking system 280, not shown in this figure, are used to track the position of the concentrator relative to the position of the sun.

There are many other types of solar power systems that are configured in other fashions to create energy, such as, concentrating photovoltaic solar array systems. These types of systems utilize a plurality of concentrating photovoltaic assemblies 300, one of which is illustrated in FIG. 3. The concentrating photovoltaic assembly 300, like the TSCAs comprises a type of concentrator 310, an inclinometer system 200, and a local control system 250. Instead of a flow loop that carries a HCE 114, however, the concentrating photovoltaic assembly 300 has a receiver 320. The receiver 320 is typically made up of photovoltaic cells that are used to absorb the sun's radiant energy that is collected from the concentrator 310 and convert the radiant energy directly to electricity. The concentrating photovoltaic assemblies 300 may rotate along only one axis, the y-axis, but typically, in order to maximize the radiant energy from the sun, they rotate about both the x-axis and y-axis. In this case, multiple inclinometer systems 200, and possibly multiple local control systems 250, may be necessary for each axis of rotation.

Other types of solar power systems include direct photovoltaic solar array systems. These types of systems comprise of a plurality of linked direct photovoltaic assemblies 400, one of which is illustrated in FIG. 4. A direct photovoltaic assembly 400, like the concentrating photovoltaic assembly 300, comprises an inclinometer system 200, and a local control system 250. However, the direct photovoltaic assembly 400 will not have a receiver 320. On the other hand, the direct photovoltaic assembly 400 will have multiple photovoltaic cells 410. As is the case with the concentrating photovoltaic assemblies 300, the direct photovoltaic assemblies 400 may rotate about both the x-axis and y-axis. However, the direct photovoltaic assemblies 300 are not as sensitive to the exact position of the sun, so in many embodiments the direct photovoltaic assemblies 300 will only rotate about one axis, the y-axis. In this case, only one inclinometer system 200 and local control system 250 is necessary.

FIG. 5 illustrates one embodiment of the invention illustrating the structural and computer components of the inclinometer system 200, the local control system 250, the sun tracking system, and interaction with the central control system 270 in accordance with at least one embodiment of the invention. As illustrated in FIG. 5, the central control system 270 is operatively coupled, via a network 502, to the inclinometer system 200, the local control system 250, and the sun tracking system 280. In this way, the user 504 or the central control system can automatically receive and send electronic information, including positioning information, to and from these systems. The network 502 may be a global area network (GAN), such as the Internet, a wide area network (WAN), a local area network (LAN), or any other type of network or combination of networks. The network 502 may provide for wireline, wireless, or a combination of wireline and wireless communication between devices and systems in the network 502.

As illustrated in FIG. 5, the central control system 270 generally includes a communication device 271, a processing device 272, and a memory device 273. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 272 is operatively coupled to the communication device 271 and the memory device 273. The processing device 272 uses the communication device 271 to communicate with the network 502, and other devices on the network 502, including, but not limited to, the inclinometer system 210, the local control system 250, and the sun tracking system 280. As such, the communication device 271 generally comprises a modem, server, or other device for communicating with other devices on the network 502, and a display, mouse, keyboard, microphone, and/or speakers for communicating with one or more users 504, including an employee. As further illustrated in FIG. 5, the central control system 270 includes computer-readable instructions 274 stored in the memory device 273, which include the computer-readable instructions 274 of an array positioning application 275. As discussed later, the array positioning application 275, allows the user 504 to receive or send information related to the positioning of the solar array system. In some embodiments, the memory device 273 includes a datastore 277 for storing data related to the central control system 270, including, but not limited to, data created or used by the array positioning application 275.

The inclinometer system 200 generally includes a communication device 211, a processing device 212, and a memory device 213, as well as an inclinometer device 220. The processing device 212 is operatively coupled to the communication device 211, the memory device 213, and the inclinometer device 220. The processing device 212 uses the communication device 211 to communicate with the network 502, and other devices on the network 502, including, but not limited to, the central control system 270, the local control system 250, and the sun tracking system 280. As such, the communication device 211 generally comprises a device(s) for communicating with other devices on the network 502. As further illustrated in FIG. 5, the inclinometer system 200 contains computer-readable program instructions 214 stored in the memory device 213, which includes the computer-readable instructions 214 of a positioning application 215. The positioning application 215, in one embodiment, instructs the local control system 250 to move a solar assembly to a position based on information from the inclinometer device 220. In some embodiments, the memory device 213 includes a datastore 217 for storing data related to the inclinometer system 200, including, but not limited to, data created or used by the positioning application 215. Although FIG. 1 illustrates the inclinometer system 200 as one system, it is important to note that there can be one or multiple systems, or the inclinometer systems 200, can be incorporated with other systems, such as the sun tracking system 280 or local control system 250.

The local control system 250 generally includes a communication device 251, a processing device 252, and a memory device 253, as well as a motor 240, gears 242, a drive shaft 244, or other equivalent hardware. The processing device 252 is operatively coupled to the communication device 251, and the memory device 253, as well as the motor 240. The processing device 252 uses the communication device 251 to communicate with the network 502, and other devices on the network 502, including, but not limited to, the central control system 270, the inclinometer system 200, and the sun tracking system 280. As such, the communication device 251 generally comprises a device(s) for communicating with other devices on the network 502.

As further illustrated in FIG. 5, the local control system 250 contains computer-readable program instructions 254 stored in the memory device 253, which includes the computer-readable instructions 254 of a local control application 255. The local control application 255, in one embodiment, includes the information necessary to control the motor to position the solar array. In some embodiments the memory device 253 includes a datastore 257 for storing data related to the local control system 250, including, but not limited to, data created or used by the local control application 255. Although FIG. 5 illustrates the local control system 250 as one system, it is important to note that there can be one or multiple systems with one or multiple local control applications 255, or the local control system 250 can be incorporated with other systems, such as the inclinometer system 200, the central control system 270, and the sun tracking system 280.

In other embodiments the local control system 250 can have fewer, additional, or different components to aid in the positioning of the solar array assemblies. The local control system 250 is positioned on one or more axes of the solar array assemblies. The local control system 250 can move the solar arrays in one axis and in some cases over multiple axes. In other embodiments, the local control system 250 is placed on multiple axes to position the solar arrays based on information and directions received from the inclinometer system 200, sun tracking system 280, and central control system 270.

The sun tracking system 280 generally includes a communication device 281, a processing device 282, and a memory device 283, as well as a sun sensor 290. The processing device 282 is operatively coupled to the communication device 281, the memory device 283, as and the sun sensor 290. The processing device 282 uses the communication device 281 to communicate with the network 502 and other devices on the network 502, including but not limited to, the central control system 270, the inclinometer system 200, and the local control system 250. As such, the communication device 281 generally comprises a device(s) for communicating with other devices on the network 502.

As further illustrated in FIG. 5, the sun tracking system 280 contains computer-readable program instructions 284 stored in the memory device 283, which includes the computer-readable instructions 284 of a sun tracking application 285. The sun tracking application 285, in one embodiment, includes the information necessary to send and receive data related to the position of the sun in the sky. In some embodiments, the memory device 283 includes a datastore 287 for storing data related to the sun tracking system 280, including, but not limited to, data created or used by the sun tracking application 285. Although FIG. 5 illustrates the sun tracking system 280 as one system, it is important to note that there can be one or multiple systems with one or multiple sun tracking applications 285, or the sun tracking system 280 can be incorporated with other systems, such as the inclinometer system 200, the central control system 270, and the local control system 250.

There are a number of different sun tracking systems 280 that may be utilized to position the photovoltaic cells or concentrator reflectors in the solar arrays to the proper orientation. These sun tracking systems 280 vary depending on the type of solar array systems they are used in conjunction with, but there are generally two types of systems, namely, open loop and closed loop sun tracking systems 280.

Typically, in a closed loop sun tracking system 280, a sun sensor 290 is aligned to the centerline of a tracking system defined by a reflective surface capturing the position of the sun. As such, the sun sensor generates error signals between the centerline of the reflective surface and the line-of-sight to the sun (i.e. the sun reference vector). The sun sensor 290 will relay to the central control system 270 or the local control system 250, that the position of the sun has moved and that the local control system 250 need to move to reposition the solar array assemblies to a position where the cells or mirrors are receiving the maximum amount of the sun's radiant energy.

While a closed loop sun tracking system 280 can be effective, it is generally quite expensive due to the addition of one or more sun sensors 290, the attendant cabling, additional interface electronics, computer software, and increased operational and maintenance costs attributable to the additional hardware. Further, a closed loop sun tracking system 280 has difficulty maintaining track during periods of cloud cover. In this regard, if the reflective surface is not pointing at the sun when the sun comes out from behind the clouds, then it is out of position.

Further, sun sensors have reliability issues. The face or lens of the sun sensor 290 may become dirty, such as from dust, sand or other airborne particles. Sun sensors 290 having a dirty lens may cause uneven illumination of the solar cells which, in turn, creates tracking errors and also loss of track during low sun irradiance levels. Closed loop sun tracking systems 280 also suffer from an additional cost of aligning the sun sensors 290 to the centerline defined by the reflective surface and maintaining this alignment over time.

In an open loop sun tracking system 280, the position of the sun is determined without the use of a sun sensor 290. The simplest form of an open loop system simply tracks the position of the sun in the sky based on the time of the day and repositions the solar array assemblies accordingly. Other forms of sun tracking without the use of sun sensors 290 at the solar array system include calculating the position of the sun by a set of ephemeris equations.

Still in other embodiments of the invention positioning of the sun can be calculated at other locations and transferred over communication mediums, such as radio waves, the internet, etc. indicating the position of the sun in the sky for a particular location at a particular time. Specifically, the United States Navy has a program that provides sun position information for a given geographic location for a given time of day and calendar date. (See http://aa.usno.navy.mil/data/docs/RS_OneDay.php). In some embodiments of this invention this data can be used by some solar power systems to position the angles of the solar array assemblies to receive the most radiant sun light from the sun.

In still other embodiments, the current position of the sun relative to a current geographic location may be determined based on an algorithm. Various algorithms are known for calculating position of the sun relative to a specific geographic location for a given time of day and calendar date. For example, the following papers provide in-depth discussions and algorithms for determining sun position:
1) Michalsky, J. J., *The astronomical almanac's algorithm for approximate solar position.*, Sol. Energ. 1988, 40, 227-235;
2) Reda, I.; Andreas, A. *Solar position algorithm for solar radiation applications.*, Sol. Energ. 2004, 76, 577-589.
3) Grena, R., *An algorithm for the computation of the solar position.*, Sol. Energ. 2008, 82, 462-470;
4) Chong, K. K.; Wong, C. W., *General formula for on-axis sun tracking system and its application in improving tracking accuracy of solar collector.*, Sol. Energ. 2009, 83, 298-305; and
5) Lee, C. Y.; Chou, P. C.; Chiang, C. M.; Lin, C. F., *Sun Tracking Systems: A Review*, Sensors 2009, 9, 3875-3890.
All of the above references are incorporated herein by reference.

The position of the solar array assemblies in some embodiments is determined through the use of an inclinometer system 200. Different types of inclinometers devices 220 have been used in the past within solar array assemblies. These inclinometer devices 220 are typically mechanical devices that measure the position of the solar panels by measuring inclination angles of the solar array assemblies. An example of a mechanical inclinometer device 600 is illustrated in FIG. 6. This type of inclinometer uses a potentiometer 610 to measure the change in the tilt of the device by measuring the distance the device has rotated. The mechanical inclinometer device 600 has a weight 620 that takes advantage of the Earth's gravity vector with respect to a horizontal axis in relation to the Earth's surface. The potentiometer has a lever 630 that is secured to the weight 620 so when the solar array assembly is moved the weigh 620 will stay in position with respect to the Earth's gravity vector and rotate the potentiometer 610 to measure the change in the angle of the solar array assembly. The device is secured in a housing 640 that is attached to the solar array assembly along one axis. If two axes are to be measured, then a mechanical inclinometer device 600 is attached to each axis.

There are various problems associated with the mechanical inclinometer device 600. First, the mechanical inclinometers operate with an 8-bit processor, which only provides an accuracy of 1.4 degrees of error. Furthermore, since the potentiometer 610 is used, the inclinometer system 200 must be calibrated during installation, as well as various times throughout the year, resulting in increased maintenance costs. The potentiometer 610 is also proned to damage. The bearings often break because the weight 620 needed in the system to turn the potentiometer 610 and stay in line with the Earth's gravity vector is typically too heavy for the potentiometer 610. The tolerances necessary to provide the required sensitivity for positioning results in tolerances that are too small, and thus, result in mechanical failures, inadequate sealing, and poor positioning resolution of the inclinometer system 200. The temperatures under which the mechanical inclinometer device 600 operates within are extremely high and often failure of the device is due to the high temperatures. In general, the mechanical inclinometer device 600 is an electrical/mechanical system and thus, in general, has many potential failure modes and is difficult to repair.

In some embodiments the mechanical inclinometer device 600 has been replaced with an optical inclinometer device 700 as illustrated in FIG. 7. The device also includes a weight 720, a lever 730, and a housing 740, but instead of using a potentiometer 610 the position is calculated through an optical window assembly 710. The optical window assembly has an optical window with a window reader. As the solar assembly arrays move, windows (transparent areas) in the optical window can be read by the optical reader. The processing device 212 transmits the solar array assembly position back to the central control system 270 through the positioning system application 215 based on what optical window(s) are read by the optical reader.

There are many issues with the design of the optical inclinometer device 700. It too is a mechanical/electronic assembly and therefore must be calibrated on installation and periodically afterwards. The window that turns uses sensors with very close tolerances and the optical window assembly 710 along with the rest of the device is very complicated. As with the mechanical inclinometer device 600, the optical inclinometer window device 700 uses an 8-bit processor, which may result in up to a 1.4 degree error with the position of the sun. Under the current configuration this is the best sensitivity that may be achieved. In order to increase the sensitivity, more bits are necessary. By increasing the sensitivity, the device would have to be increased from an 8-bit system, which has 255 positions, to a 10-bit or 12-bit system, which has 4,080 positions. In order for the optical window assembly 720 to have this many positions programmed on the optical window 712, the size of the optical window 712 would greatly exceed the current size, for example 2 ft. or wider, thus making the more sensitive optical window assembly 710 impractical.

Furthermore the glass design of the optical window assembly 710 is very fragile, and if it is dropped it will likely need to be replaced due to breakage of the glass at the very least, a re-calibration would be necessary. Furthermore, the devices are costly to fix, thus they are replaced instead of being repaired. Since the devices are complex, they are expensive to purchase, maintain, and replace.

In addition to the problems indicated above some of the inclinometer devices 220 used are filled with oil to dampen the movement of the inclinometer. This is typically not needed due to the slow rate of tracking movement of the solar array assemblies. The oil can seep into the electronic circuits and on the glass sensors causing failures.

Furthermore, conventional inclinometer devices 220 used in the past only provide the position data of the solar array assemblies. The central control system 270 then uses the position data along with sun positioning data from the sun tracking system 280 to command the motors in the local control system 250 to move the solar array assembly. The inclinometer systems 200 of the past typically do not have the ability to control each individual solar array assembly by controlling the local control system 250 directly.

In order to overcome the issues associated with the current inclinometers, embodiments of the present invention include an inclinometer that uses a magnetometer, as opposed to the traditional weight and lever system, to determine positional/orientation changes. A magnetometer is a known device that measures the strength and/or direction of a magnetic field to which the magnetometer is subjected. Changes in the magnetic field due to movement of the magnetometer can be detected. These detected changes are indicative of the amount the magnetometer has moved. Magnetometers are highly sensitive and can sense with high accuracy changes in the magnetic field.

When placed on a moveable structure, such as a solar array, a magnetometer can sense with high accuracy, movement of the solar array by sensing changes in a magnetic field subjected to the magnetometer, where the changes are associated with movement of the sensor relative to the magnetic field. These changes can be correlated to physical position changes of the solar array. By accumulating these changes over time, the position of the solar array can be determined and tracked.

As illustrated in FIG. 8, in at least one embodiment of the present invention, the inclinometer device 220 may include at least one magnetometer 810 positioned within a housing 830 of the inclinometer. Connected to the magnetometer 810 may be various electronics, such as a processor 820 for communicating therewith to determine position information of the inclinometer device and, in turn, the device to which the inclinometer device is connected, such as a solar array. The processing device 212 of the inclinometer system 200 receives signals from the magnetometer which represent changes in the position of the array about an axis. The processing device 212 includes an integrator, not shown, in either hardware, software, or hardware/software form, that integrates output from the sensor over time. Knowing an initial starting position for the inclinometer, the processing device 212 can update position information based on the output of the magnetometer to provide an accurate determination of the current position of the inclinometer and the structure to which it is connected (e.g., a solar array).

There are various types of magnetometers that may be implemented in the system. Two basic types of magnetometers are scalar magnetometers and vector magnetometers. Scalar magnetometers measure the total strength of the magnetic field to which they are subjected. Vector magnetometers have the capability to measure the component of the magnetic field in a particular direction. Examples of scalar magnetometers are: rotating coil, Hall effect, and proton precession. Examples of vector magnetometers are fluxgates, superconducting quantum interference devices (SQUIDs), and spin-exchange relaxation-free (SERF) atomic magnetometers.

Further, more than one magnetometer can be used when position about different axes of rotation is desired. Some vector magnetometers allow for three orthogonal sensing of magnetic field strength, inclination and declination to be uniquely defined and collect data thereon.

In some embodiments of the invention, the inclinometer system 200 may use one of the following magnetometers sourced from Austriamicro Systems: AS5043 or AS5145 or AS5163 (14 bit). These magnetometers are self-contained systems that sense magnetic field variations from a Hall array. They operate based on magnetic anomaly detection. As the sensor is moved, the magnetic field is altered a proportional amount. The magnetometer records these magnetic field variations. These magnetometers are contactless rotary encoders. The magnetometer includes an encoder that is a 10-bit programmable angle magnetic rotary encoder with absolute digital, analog, or pulse-width-modulated (PWM) outputs. The encoder is a contactless, magnetic angle encoder for accurate measurement up to and including 360 degrees. It is a system-on-chip, combining integrated Hall elements, analog front end and digital signal processing in a single device. The encoder provides a digital 10 to 14-bit output, as well as, a programmable analog output that is directly proportional to the angle of a magnet rotating over the chip. The analog output can be configured in many ways, including user programmable angular range, adjustable output voltage range, voltage for current output, etc. The AS5043 device is programmable to output either an analog or digital signal. The AS5145 device is programmable to output either digital or PWM. The AS5163 can be programmed to output analog, digital, or PWM. The AS5043 and AS5145 devices are rated to 125° C. and the AS5163 device is rated to 150° C. The higher temperature rating of the AS5163 is advantageous in a solar array environment given the extreme environmental temperatures.

There are many advantages to using the magnetometer inclinometer 800 in the system, as opposed to the inclinometers used in the past. First, most magnetometer based sensors provided 8, 12, 16 or more bit accuracy. The magnetometer inclinometer 800 can thus be used with the current solar array systems providing accuracy up to 1.4 degrees like the previous inclinometer, through an 8-bit system, as is currently used in the SEGS systems. However, in other embodiments of the invention the same magnetometer inclinometer 800 can be used to increase the sensitivity of the inclinometer system 200.

For example, where an AS5043, AS5145 or AS5163 (14 bit) device is employed, the sensor includes an analog output that can be used with a low pass filter 816 to feed to an analog to digital (A/D) converter 818 with adjusted input. The resulting 8-bit digital output is converted to gray code. The resulting signal is compatible with the current logic of some solar array fields, including the current SEGS system, but it is limited to a 1.4 degree output because of the 8-bit A/D converter. The sensor and pickup device has a dual mode that allows for future, more accurate, positional readings for future inclinometer systems 200. It is possible to improve the 1.4 degree division using pulse-width-modulated ("PWM") analog output. The sensitivity is improved by using the 8-bit output for a low and another 8-bits (would only use two to four of the second 8-bits available) for a high.

Furthermore, with the addition of a programmable interface computer, accuracies in range of 1.4 to 0.021875 degrees of arc can be achieved, for example, by using 10-bits (0.35 degrees of arc), 12-bits (0.0875 degrees of arc), or 14-bits (0.021875 degrees of arc). This provides options for improving the accuracy of the solar array systems, including averaging multiple readings of position, incorporating timing delays, etc. into the tracking system.

In addition to the improved compatibility of the magnetometer inclinometer 800 and the potential for improved accuracy, the magnetometer inclinometer 800 has many other advantages over previous inclinometers. The magnetometer is relatively easy to build, it has high reliability, and it is easy to troubleshoot and repair if necessary, whereas previous inclinometers were complex, not reliable, and not easily repaired. The magnetometer inclinometer will operate in high temperatures, up to 400 degrees Celsius, without failure. Furthermore, it is cheaper than the other inclinometers currently used that have the same or worse accuracies. The magnetometer inclinometer 800 uses a sensor and pickup device that is non-contact, inexpensive, and extremely reliable.

There are various modes of operation using the inclinometer of the invention in a solar array system. As mentioned above, one mode would be to simply replace the current mechanical inclinometer with the inclinometer described herein. With reference to FIG. 5, in this embodiment, the magnetometer inclinometer 800 takes the place of the inclinometer 220. In this first configuration, the magnetometer inclinometer 800 provides position change data regarding movement of the solar array similar to the replaced mechanical inclinometer, but with increased accuracy and durability, and with decreased implementation and maintenance cost.

With regard to FIG. 9, in this configuration, the magnetometer (or magnetometers if more than one positional axis orientation is being tracked) is initially configured for operation. (See block 900). The magnetometer can be zeroed relative to a known start position of the solar array. Where an AS5043 or AS5145 device is used, the known current position may be input into the devices. Where an AS5163 device is used, the device currently requires physical alignment. All changes in position/orientation of the magnetometer will be relative to the initial input position. A general range for a solar array is a maximum angle of 164° and a minimum of −35°. Where an AS5043 or AS5145 device is used, because the range for the array is 180° or less, the angular range of the devices can be cut in half to say 180° and smaller incremental values can be assigned to each discrete output to thereby increase accuracy.

After initialization, the processing device 212 associated with the sensor receives the output of the magnetometer (see block 910) and updates positional/orientation information associated with the solar array and stores the information in the datastore 217. (See block 920). The processing device either includes or operates as an integrator. The processing device periodically updates the position/orientation information of the solar array based on the output of the magnetometer, such that the position/orientation information, over time, represents the current position/orientation of the solar array.

In this embodiment, the solar array includes a sun tracking system 280 including a sun sensor. The sun tracking system provides feedback information regarding positioning of the array relative to the sun. The central control system 270 receives sun position data from the sun tracking system 280 and solar array position information from the inclinometer system 200. The central control system compares the sun position information with the solar array position and determines a difference therebetween. (See block 930). Based on this data, the central system sends commands to the local control system 250 associated with the solar array to correct positioning of the solar array relative to the position of the sun. (See block 940). This process is either a continuous or periodic loop, whereby positional corrections of the solar array are made to ensure maximum sun exposure. While not discussed in detail, the system may use certain threshold values, whereby small differences between the position of the sun and the position of the solar array are not corrected so as to conserve energy and wear and tear on equipment.

In a second configuration 1000, as illustrated in FIG. 10, the sun sensor 200 input can be replaced with sun position information data provided by another source. For example, as illustrated in FIG. 10, sun position data are stored in a datastore 1002, such that in block 930, sun position data from the third source is used as opposed to sun sensor data. For example, as discussed above, the U.S. Navy provides publicly accessible data that indicates sun position information over the course of a day for a given geographic location and a given date. Alternatively, and not shown, sun position data may be calculated by, for example, the processing device 212 based on an algorithmic calculation as described previously above.

This second configuration can be used with either the older mechanical inclinometer systems or with the magnetometer inclinometer 800 described herein. The use of such sun position data eliminates reliability and cost issues associated with a sun sensor 290 with increased accuracy. Further, use of the sun data from a source other than the sun sensor reduces excessive attempts by the system to correct positioning of the solar array due to inaccuracy and/or lack of precision in the sun sensor. Specifically, when sun sensor data is employed, because sun sensors may lack accuracy, the system may perform excessive repositioning operations in an attempt to position the solar array relative to the sun. These excessive positioning operations consume energy and increase wear and maintenance on mechanical components of the array.

The use of the described magnetometer inclinometer 800 in this configuration provides added benefits in that increased accuracy of the magnetometer inclinometer compensates for inaccuracies in the sun data. This is especially true where the magnetometer inclinometer is operated in a 12 bit or higher configuration. A combination of the increased accuracy of the magnetometer inclinometer and the sun position data sourced from something other than a sun sensor, such as data provided by the U.S. Navy or data from an algorithmic calculation, can decrease the amount of periodic repositioning operations caused by the inaccuracies of a sun sensor.

In this second configuration where a magnetometer inclinometer is used, the magnetometer (or magnetometers if more than one positional axis orientation is being tracked) is zeroed to a known start position. (See block 900). The processing device 212 associated with the sensor receives the output of the magnetometer (see block 910), updates positional/orientation information associated with the solar array and stores the information in the datastore 217. (See block 920). The central control system 270 receives sun position data from a source, such as the U.S. Navy or calculates the sun position data based on an algorithmic equation, and solar array position information from the inclinometer system 200. (See block 930) Based on this data, the central system sends commands to the local control system 250 associated with the solar array to correct positioning of the solar array relative to the position of the sun. (See block 940). This process is either a continuous or periodic loop, whereby positional corrections of the solar array are made to ensure maximum sun exposure.

As mentioned relative to FIG. 5, in a conventional system, the central control system 270 receives data from the inclinometer system 200 and the sun tracking system 280 and sends commands to the local control system 250 for positioning the solar array. In an alternative configuration, the local control system 250 may be directly controlled by the inclinometer system 200. For example, as illustrated in FIG. 11, in this embodiment 1100, the processing device 212 of the inclinometer system 200 of this embodiment may receive sun position information directly from either the sun tracking system 280, if one is employed, or a datastore 1002 containing sun position information (usually in instances where sun position data is provided by a third source such as the U.S. Navy or based on an algorithmic calculation). The processing device 212 determines position of the solar array based on data output by the inclinometer device 220 (see block 920) and determines a difference in position between the current position of the solar array and the current sun position. (See block 930). The processing device 212 then provides commands directly to the local control system 250 to reposition the solar array. (See block 940).

In FIG. 11, the local control system 250 and the datastore 1002 are illustrated as directly connected to the inclinometer system 200. The direct connection is illustrated to indicate that the inclinometer system 200 directly communicates with these systems. It is to be understood that the connection between these systems could be any type of connection, including a network connection similar to what is illustrated in FIG. 5.

The above embodiments describe the invention in the context of a solar array. The systems, methods, and computer program products of the invention may be applied to various moveable structures where detection of position of the structure is desired. For example, in one embodiment, an inclinometer comprising a magnetometer may be coupled to the moveable structure. A processing device in communication with the inclinometer receives output from the magnetometer and updates position information regarding the position of the moveable structure about the one or more axes. A driving system may be associated with the moveable structure for altering the position of the moveable structure about the one or more axes based on commands from the processing device.

The processing device may be capable of comparing the current position of the moveable structure to a desire position for the moveable structure. For example, where the moveable structure is an antenna, crane, boom arm, mechanical arm, etc. positional information may be provided for orienting the moveable structure to a desired position. In these embodiments, the processing device determines the current position of the moveable structure based on information from the magnetometer and receives or determines desired position information for the structure and compares the two values. Based on this comparison, the processing device sends commands to the drive system to orient the moveable structure to the desired position.

The above descriptions disclose use of a magnetometer as a sensor for sensing position changes in movable structure (e.g., solar array). It is understood that other technologies could be employed which remove issues associated with the conventional mechanical inclinometer system. A few alternate systems are disclosed below.

For example, in one embodiment, an accelerometer may be used as an inclinometer. The accelerometer senses accelerations caused by movement of the solar array. These accelerations can be converted to positional changes of the solar array and integrated over time. These positional changes can then be used to update the position information for the solar array in a similar manner as described above.

Still in other embodiments of the invention GPS positioning may be used to calculate the position of the solar array assemblies. The accuracy of GPS positioning may be sufficient to provide acceptable accuracy if more than three satellites are used for the positional calculations.

A gyroscope may also be employed as a position sensor. Various gyroscopes are known for use in aircraft navigation. The gyroscopes sense rotational changes in a structure. Gyroscopes are currently implemented in MEMs technology devices of sufficiently small dimension for application in a solar array.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

The invention claimed is:

1. A system for monitoring/controlling a position of a solar array comprising:
one or more inclinometers coupled to the solar array, wherein said inclinometers are positioned to sense rotation of the solar array, wherein each of said inclinometers comprises one or more magnetometers configured to sense positional changes of the solar array about an axis based on changes in a direction of a sensed magnetic field generated by one or more magnets co-located with the magnetometers at a substantially fixed position relative to the one or more magnetometers, where said changes in a direction of a sensed magnetic field are caused by positional changes of the one or more magnetometers relative to the magnetic field of the one or more magnets, as either the one or more magnetometers or one or more magnets rotate with the solar array; and
one or more processing devices in communication with said one or more inclinometers, wherein said one or more processing devices receive output from the one or more inclinometers and update position information regarding the position of the solar array.

2. A system according to claim 1, further comprising a drive system associated with the solar array for altering the position of the solar array based on commands from said one or more processing devices.

3. A system according to claim 2, wherein said processing devices are located in the same housing as said inclinometer.

4. A system according to claim 1, further comprising a source of sun position data indicating a current position of the sun in the sky, wherein said processing devices are configured to compare a current position of the solar array relative to the sun position data.

5. A system according to claim 4, wherein said source of sun position data is a sun sensor associated with the solar array.

6. A system according to claim 4, wherein said source of sun position data is a database comprising sun position data for a plurality of different times in a day.

7. A system according to claim 4, wherein said source of sun position data is a calculated sun position based on a formula or algorithm.

8. A system according to claim 4 further comprising a drive system associated with the solar array and in communication with said processing devices for altering the position of the solar array,
wherein said processing devices are configured to compare position information regarding the position of the solar array with sun position data and send commands to said drive system to alter the position of the solar array.

9. A system according to claim 1, wherein said one or more magnetometers are capable of providing an accuracy of about 0.021875 degrees of arc.

10. A system according to claim 1, wherein said one or more magnetometers are capable of providing an accuracy in the range of about 1.4 degrees to about 0.021875 degrees of arc.

11. A system according to claim 1, wherein one of said inclinometers is coupled to the solar array and is positioned to sense rotation of the solar array about a non-vertical axis, wherein the inclinometer comprises one or more magnetometers configured to sense positional changes of the solar array about the non-vertical axis based on changes in a direction of a sensed magnetic field generated by one or more magnets co-located with the one or more magnetometers.

12. A system for monitoring/controlling a position of a moveable structure comprising:
one or more inclinometers coupled to the moveable structure, wherein said inclinometers are positioned to sense rotation of the moveable structure, wherein each of said inclinometers comprises one or more magnetometers configured to sense positional changes of the moveable structure about an axis based on changes in a direction of a sensed magnetic field generated by one or more magnets co-located with the magnetometers at a substantially fixed position relative to the one or more magnetometers, where said changes in a direction of a sensed magnetic field are caused by positional changes of the one or more magnetometers relative to the magnetic field of the one or more magnets, as either the one or more magnetometers or one or more magnets rotate with the moveable structure; and one or more processing devices in communication with said one or more inclinometers, wherein said one or more processing devices receive output from the one or more inclinometers and update position information regarding the position of the moveable structure.

13. A system according to claim 12, further comprising a drive system associated with the moveable structure for altering the position of the moveable structure based on commands from said one or more processing devices.

14. A system according to claim 13, wherein said processing devices are located in the same housing as said inclinometer.

15. A system according to claim 12, further comprising a source of position data indicating a desired position for the moveable structure, wherein said processing devices are configured to compare a current position of the solar array relative to the sun position data.

16. A system according to claim 15 further comprising a drive system associated with the solar array and in communication with said processing devices for altering the position of the solar array, wherein said processing devices are configured to compare position information regarding the position of the solar array with sun position data and send commands to said drive system to alter the position of the solar array.

17. A system according to claim 12, wherein said one or more magnetometers are capable of providing an accuracy of about 0.021875 degrees of arc.

18. A system according to claim 12, wherein said one or more magnetometers are capable of providing an accuracy in the range of about 1.4 degrees to about 0.021875 degrees of arc.

* * * * *